No. 872,397. PATENTED DEC. 3, 1907.
J. P. WULFF.
ANTIFRICTION WHEEL BEARING.
APPLICATION FILED JAN. 10, 1907.
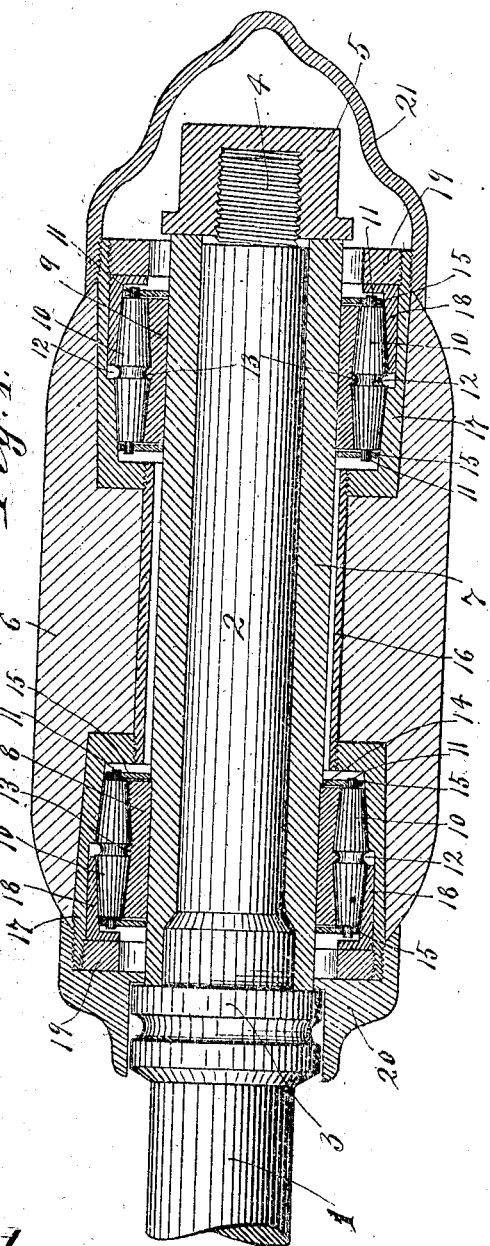
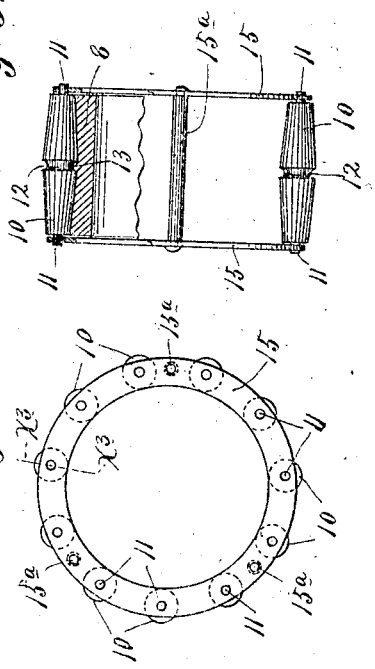
Witnesses.
A. H. Opsahl.
Inventor.
John P. Wulff.
By his Attorneys
Williamson & Merchant

UNITED STATES PATENT OFFICE.

JOHN P. WULFF, OF MINNEAPOLIS, MINNESOTA.

ANTIFRICTION WHEEL-BEARING.

No. 872,397.

Specification of Letters Patent.

Patented Dec. 3, 1907.

Application filed January 10, 1907. Serial No. 351,619.

*To all whom it may concern:*

Be it known that I, JOHN P. WULFF, a citizen of the United States, residing at Minneapolis, in the county of Hennepin and State of Minnesota, have invented certain new and useful Improvements in Antifriction Wheel-Bearings; and I do hereby declare the following to be a full, clear, and exact description of the invention, such as will enable others skilled in the art to which it appertains to make and use the same.

My invention has for its object to provide an anti-friction bearing adapted for application to axles and wheel hubs of standard or the usual construction, and to the above ends the invention consists of the novel devices and combinations of devices hereinafter described and defined in the claims.

The invention is illustrated in the accompanying drawings, wherein like characters indicate like parts throughout the several views.

Referring to the drawings, Figure 1 is a view partly in plan and partly in horizontal section, showing my improved anti-friction bearing device applied to an axle and wheel hub. Fig. 2 is a detail in elevation, showing one of the roller spacing devices; and Fig. 3 is a view partly in plan and partly in section on the line $x^3$ $x^3$ of Fig. 2, showing the same roller spacing device.

The numeral 1 indicates a vehicle axle having the usual journal 2, stop collar 3 and threaded end 4.

The numeral 5 indicates the usual cap nut which works on the threaded end 4 of the said axle.

The numeral 6 indicates the wheel hub.

Of the parts of the improved journal or anti-friction bearing device, the numeral 7 indicates a bearing sleeve which is adapted to fit the axle journal 2 and to be rigidly clamped against the stop collar 3 thereof by the cap nut 5, so that it becomes, in effect, a fixed part of the said journal. Mounted respectively on the inner and outer portions of the sleeve 7 is a pair of bearing collars 8 and 9 that constitute run-ways for reversely tapered rollers 10. The rollers 10 are tapered toward their ends and terminate in trunnions 11. At their central portions, the rollers 10 are provided with annular grooves 12 that engage annular ribs 13 of the bearings 8 and 9, thus assisting in holding the rollers against endwise movement. The said bearing collars 8 and 9 flare from their intermediate toward their end portions to fit the taper of the rollers 10. The collar 8 engages with a shoulder 14 on the sleeve 7 and it may be keyed to the said sleeve; but the bearing collar 9 must be free to slide upon the said sleeve. The bearing rollers 10 are held properly spaced by light spacing rings 15 that are provided with perforations through which the trunnions 11 project, the outer ends of said trunnions being preferably upset slightly and are connected by rods $15^a$.

The numeral 16 indicates a short sleeve that loosely surrounds the sleeve 7, and to the ends of which are secured, by threaded engagement, wide annular bushings or sleeve extensions 17. These bushings or sleeve extensions 17 are formed with conical bearing surfaces that engage the outer surfaces of the inner conical portions of the respective sets of rollers 10. Mounted to slide within the outer portions of the sleeve extensions 17, are annular roller bearings rings 18, the inner surfaces of which are tapered to fit the outer surfaces of the adjacent end portions of the rollers 10. The bearing rings 18 may be adjusted by annular nuts 19 that work with threaded engagement in the extreme ends of the sleeve extensions 17.

The numeral 20 indicates an annular hub clamping collar that engages external threads on the end of the inner bushing or sleeve extension 17, and the numeral 21 indicates a cap that engages external threads on the end of the outer bushing or sleeve extension 17.

In applying the anti-friction bearing device above described to an ordinary wheel hub such as found in general use, the said hub, of course, must be bored out to form seats for the sleeve 16 and bushings or sleeve extensions 17, and at least one of the sleeve extensions must be applied to the said sleeve after the said sleeve is applied to the said hub. The hub is secured to the said sleeve and bushings or sleeve extensions when it is clamped between the collar 20 and cap 21. Said cap, of course, also acts as a dust guard to prevent dust or dirt from entering the outer portion of the journal. Any wear may be taken up at any time by the adjustment of the roller bearing member 18, and it will be understood that the bearing ring or member 9, being free to move on the sleeve 7, may assume whatever position is required under the various adjustments of the said bearing member 18.

From what has been said it is thought to be evident that the anti-friction bearing device above described may be very easily applied to wheels and axles of standard construction. In practice the said bearing devices may be made in different sizes and the sleeve 7 may be provided with internal bores of different shape and diameter to adapt them for application to various shaped and sizes of axle journals.

What I claim is:

1. The combination with a sleeve adapted to fit and to be secured upon the journal of an axle, of a pair of bearing collars on said sleeve, one of which is capable of sliding movement thereon, a pair of bushings adapted to be inserted into the hub of a wheel, bearing rings within said bushings, reversely tapered rollers working on said bearing collars and within said bushings and bearing rings, and annular nuts working in the ends of said bushings for adjusting said bearing rings, substantially as described.

2. The combination with a bearing sleeve 7 adapted to fit upon and to be secured to the journal of an axle, bearing collars 8 and 9 on said sleeve 7, of a sleeve 16 surrounding the intermediate portion of said sleeve 7, bushings 17 detachably secured to the ends of said sleeve 16 and adapted to be inserted into the hub of a wheel, bearing rings fitted within said bushings, reversely tapered rollers 10 working on said bearing collars and within said bushings and bearing rings, roller spacing rings 15 connected to the ends of said rollers, and annular nuts 19 working within the ends of said bushings and serving to adjust said rings 18, substantially as described.

3. The combination with a hub 6 and an axle 1 having a fixed collar 3, journal 2 and threaded end 4, of a sleeve 7 fitting said journal, a nut 5 working on said threaded end 4 and coöperating with said collar 3 to clamp said sleeve 7, the bearing collars 8 and 9 on said sleeve 7, a short sleeve 16 surrounding the intermediate portion of said sleeve 7, the bushings 17 having screw-threaded engagement with the ends of said sleeve 16 and fitting in said hub 6, bearing rings 18 in the ends of said bushings, the reversely tapered bearing rollers 10 working on the said collars 8 and 9 and within said bushings 17 and rings 18, annular nuts 19 working in the ends of said bushings for adjusting said rings 18, a clamping collar 20 threaded onto the end of the inner bushing 17, and a cap nut 21 threaded onto the outer end of the outer bushing 17, and inclosing the nut 5, substantially as described.

In testimony whereof I affix my signature in presence of two witnesses.

JOHN P. WULFF

Witnesses:
MALIE HOEL,
F. D. MERCHANT.